United States Patent
Li et al.

(10) Patent No.: US 9,264,499 B2
(45) Date of Patent: Feb. 16, 2016

(54) CLOUD DATA STORAGE LOCATION MONITORING

(71) Applicants: Hong Li, El Dorado Hills, CA (US);
John B. Vicente, Roseville, CA (US);
Mark D. Yarvis, Portland, OR (US);
James R. Blakley, Portland, OR (US)

(72) Inventors: Hong Li, El Dorado Hills, CA (US);
John B. Vicente, Roseville, CA (US);
Mark D. Yarvis, Portland, OR (US);
James R. Blakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 13/715,387

(22) Filed: Dec. 14, 2012

(65) Prior Publication Data

US 2014/0173089 A1   Jun. 19, 2014

(51) Int. Cl.
*G06F 15/173* (2006.01)
*H04L 29/08* (2006.01)

(52) U.S. Cl.
CPC .......... *H04L 67/18* (2013.01); *H04L 67/1097* (2013.01); *H04L 67/2852* (2013.01)

(58) Field of Classification Search
USPC ......... 709/213, 214, 217, 219, 223, 224, 226, 709/250
See application file for complete search history.

(56) References Cited

U.S. PATENT DOCUMENTS

| | | | |
|---|---|---|---|
| 8,417,938 B1 * | 4/2013 | Considine et al. ............ | 713/151 |
| 9,112,841 B1 * | 8/2015 | Brandwine ............ | H04L 63/08 1/1 |
| 2002/0133491 A1 | 9/2002 | Sim et al. | |
| 2005/0010620 A1 | 1/2005 | Silvers et al. | |
| 2010/0332479 A1 | 12/2010 | Prahlad et al. | |
| 2012/0130781 A1 | 5/2012 | Li | |
| 2012/0158578 A1 | 6/2012 | Sedayao et al. | |
| 2012/0272025 A1 * | 10/2012 | Park et al. ............ | 711/162 |
| 2013/0054536 A1 | 2/2013 | Sengupta et al. | |
| 2013/0191519 A1 * | 7/2013 | Chang et al. ............ | 709/223 |
| 2013/0204849 A1 | 8/2013 | Chacko | |
| 2013/0227047 A1 * | 8/2013 | Dolce et al. ............ | 709/213 |

(Continued)

OTHER PUBLICATIONS

"Apache Hadoop," Wikipedia, The Free Encyclopedia, retrieved from: <http://en.wikipedia.org/w/index.php?title=Apache_Hadoop&oldid=520334841>, edited Oct. 28, 2012, 11 pages.

(Continued)

*Primary Examiner* — Viet Vu
(74) *Attorney, Agent, or Firm* — Barnes & Thornburg LLP (57) ABSTRACT

Technologies for monitoring data storage location for cloud data include a cloud monitoring server configured to communicate with one or more cloud customer computing devices and cloud service providers. The cloud monitoring server receives monitoring requests from the cloud customer computing devices and retrieves provider information from the cloud service providers. The cloud monitoring server compiles response data based on the monitoring requests and the provider information, and sends response data to the cloud customer computing devices. Cloud customer computing devices may send on-demand monitoring requests and/or continuous, policy-based monitoring requests. For policy-based monitoring, the cloud monitoring server continually monitors the provider information and provides response data when one or more conditions specified in the policy are satisfied. The cloud monitoring server may also make recommendations and provide feedback based on the monitoring requests or the provider information. Other embodiments are described and claimed.

27 Claims, 4 Drawing Sheets

(56) References Cited

U.S. PATENT DOCUMENTS

2013/0232179 A1* 9/2013 Chhaunker et al. .......... 707/827
2014/0172929 A1 6/2014 Sedayao et al.

OTHER PUBLICATIONS

"Google File System," Wikipedia, The Free Encyclopedia, retrieved from: <http://en.wikipedia.org/w/index.php? title=Google_File_System&oldid=513743952>, edited Sep. 20, 2012, 3 pages.

"IBM General Parallel File System," Wikipedia, The Free Encyclopedia, retrieved from: <http://en.wikipedia.org/w/index.php?title=IBM_General_Parallel_File_System&oldid=512221253>, edited Sep. 13, 2012, 4 pages.

"Cloud computing," Wikipedia, The Free Encyclopedia, retrieved from: <http://en.wikipedia.org/w/index.php? title=Cloud_computing&oldid=487761996>, edited Apr. 17, 2012, 10 pages.

"Cloud storage," Wikipedia, The Free Encyclopedia, retrieved from: <http://en.wikipedia.org/w/index.php? title=Cloud_storage&oldid=486347196>, edited Apr. 9, 2012, 4 pages.

"Distributed data store," Wikipedia, The Free Encyclopedia, retrieved from: <http://en.wikipedia.org/w/index.php?title=Distributed_data_store&oldid=485131637>, edited Apr. 2, 2012, 3 pages.

"Cloud storage gateway," Wikipedia, The Free Encyclopedia, retrieved from: <http://en.wikipedia.org/w/index.php? title=Cloud_storage_gateway&oldid=484422424>, edited Mar. 28, 2012, 1 page.

Jaatun et al., "The design of a redundant array of independent net-storages for improved confidentiality in cloud computing," Journal of Cloud Computing: Advances, Systems and Applications 2012, 1:13, 19 pages.

"Enterprise service bus," Wikipedia, The Free Encyclopedia, available: <http://en.wikipedia.org/w/index.php? title=Enterprise_service_bus&oldid=500611143>, edited Jul. 4, 2012, 6 pages.

U.S. Appl. No. 13/715,241, filed Dec. 14, 2012, 47 pages.

* cited by examiner

CLOUD DATA STORAGE LOCATION MONITORING

BACKGROUND

Computer data is increasingly stored "in the cloud"; that is, stored in distributed data sources available over a ubiquitous network such as the Internet. Although often considered amorphous or abstract, data stored "in the cloud" resides in very real, physical storage devices such as computer servers and storage networks. Such physical data storage devices may be, and usually are, scattered across the world. Further, each physical data storage device may store cloud data belonging to numerous cloud data customers. However, the cloud data is usually presented as an abstract, unified data store to each cloud data customer. Thus, the physical data storage location or storage layout of the cloud data is usually invisible to the cloud data customer. Some cloud service providers provide general information on the country or region where cloud data centers are located. Additionally, some cloud service providers allow cloud data customers to purchase a so-called "dedicated cloud" to store data in a known location, at increased cost.

Governmental and other regulatory requirements may restrict a cloud data customer's ability to store data in certain physical locations. For example, the United States government restricts data relating to certain export-controlled technologies from being stored in certain controlled countries.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
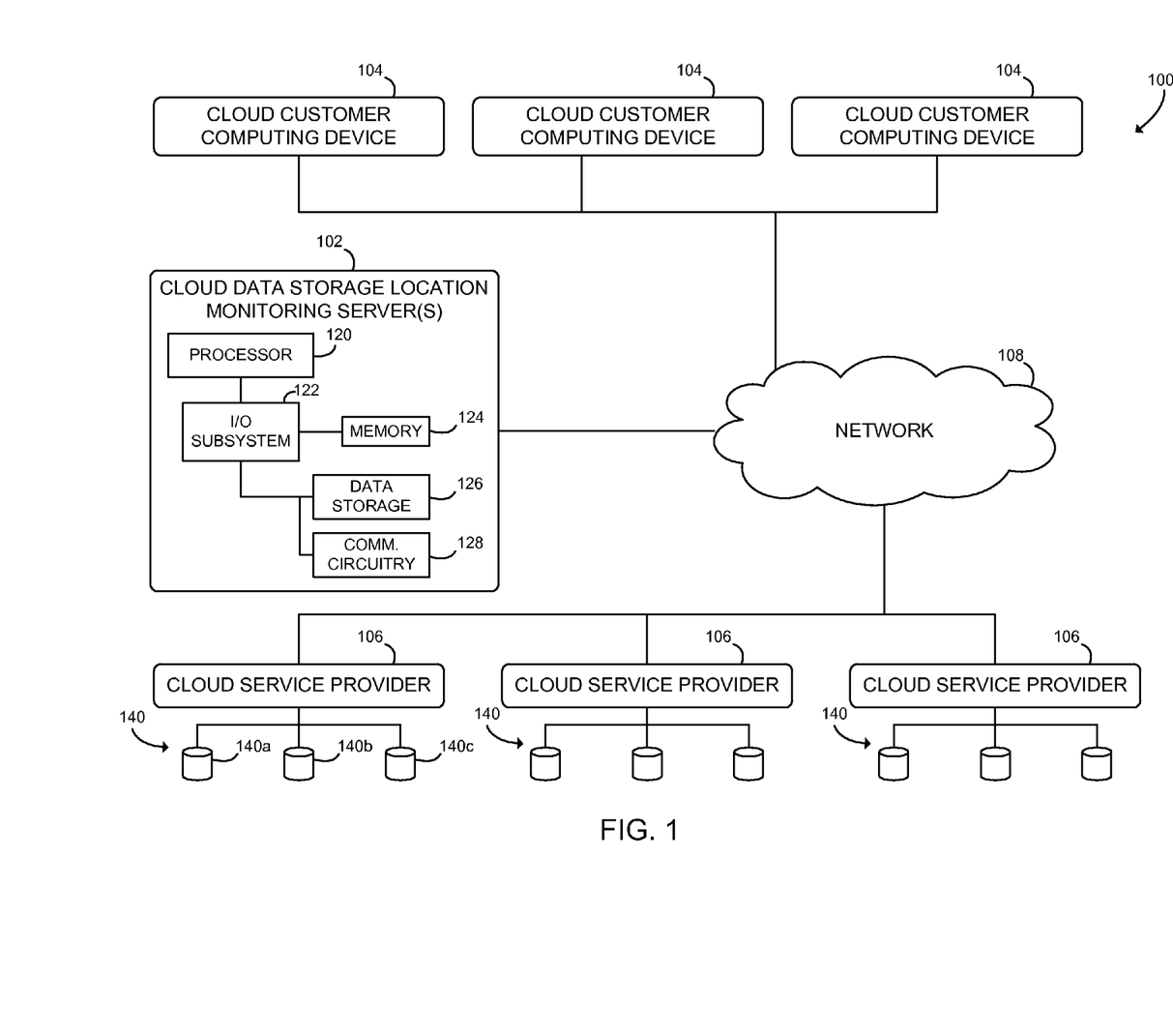
FIG. 1 is a simplified block diagram of at least one embodiment of a system for cloud data storage location monitoring.

Referring now to FIG. 1, in one embodiment, a system 100 for monitoring cloud data storage location includes a cloud data storage location monitoring server 102 (hereinafter, referred to as the "cloud monitoring server" 102), one or more cloud customer computing devices 104, and one or more cloud service providers 106, all in communication with each other over a network 108. In use, as discussed in more detail below, the cloud monitoring server 102 is configured to receive monitoring requests from the cloud customer computing devices 104, collect and analyze provider information from one or more of the cloud service providers 106, and send resulting response data to the cloud customer computing devices 104.

The disclosed technologies allow cloud data customers to obtain customized information on data storage location either on-demand or based on the occurrence of a defined event. The cloud data customer may use such customized information for several purposes. For example, the cloud data customer may use information on the status of cloud data storage location at a particular time for auditing purposes. Alternatively, a cloud data customer subject to regulation may request to be notified when data changes storage location from one location to another. Still another cloud data customer may use information on data storage location to verify and monitor contractual or operational controls on data storage location. Further, cloud data customers are able to access aggregated data for several cloud data providers with a single request. On the other side of the relationship, cloud data providers are able to provide such customized information in a cost-effective manner, with minimal impact on the provider's existing systems. The ability to provide and obtain customized cloud data storage location information in a timely and cost-effective manner allows for increased use of cloud data storage, particularly for potential cloud data customers with regulated data or operating in regulated industries.

The cloud monitoring server 102 may be embodied as any type of server computing device, or collection of devices, capable of performing the functions described herein. As such, the cloud monitoring server 102 may be embodied as a single server computing device or a collection of servers and associated devices. For example, in some embodiments, the cloud monitoring server 102 is embodied as a cloud monitoring service to perform the functions described herein. In such embodiments, the cloud monitoring server 102 may be embodied as a "virtual server" formed from multiple computing devices distributed across the network 108 and operating in a public or private cloud. Accordingly, although the cloud monitoring server 102 is illustrated in FIG. 1 and described below as embodied as a single server computing device, it should be appreciated that the cloud monitoring server 102 may be embodied as multiple devices cooperating together to facilitate the functionality described below.

In the illustrative embodiment of FIG. 1, the cloud monitoring server 102 includes a processor 120, a memory 124, an input/output subsystem 122, a communication circuit 128, and a data storage device 126. Of course, the cloud monitoring server 102 may include other or additional components, such as those commonly found in a computer server (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the cloud monitoring server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the cloud monitoring server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the cloud monitoring server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store, permanently or temporarily, monitoring requests received from the cloud customer computing devices 104, provider information received from the cloud service providers 106, or response data prepared for transmission to the cloud customer computing devices 104.

The communication circuit 128 of the cloud monitoring server 102 may be embodied as any communication circuit, device, or collection thereof, capable of enabling communications between the cloud monitoring server 102, the cloud customer computing devices 104, the cloud service providers 106, and/or other remote devices. The communication circuit 128 may be configured to use any one or more communication technology (e.g., wireless or wired communications) and associated protocols (e.g., Ethernet, Bluetooth®, Wi-Fi®, WiMAX, etc.) to effect such communication.

As discussed in more detail below, the cloud monitoring server 102 is configured to transmit and receive data with the other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), and/or a publicly-accessible, global network such as the Internet. As such, the network 108 may include any number of additional devices, such as additional computers, routers, and switches, to facilitate communications between the cloud monitoring server 102 and the other devices of the system 100.

The cloud customer computing devices 104 are configured to send monitoring requests to and receive response data from the cloud monitoring server 102, as discussed in more detail below. Each cloud customer computing device 104 is controlled by a person or entity maintaining cloud data with one or more of the cloud service providers 106. Accordingly, the cloud customer computing devices 104 may be embodied as any type of computer, mobile device, smart phone, or other computing device capable of performing the functions described herein. As such, the cloud service providers 106 may include components and features similar to the cloud monitoring server 102, such as a processor, I/O subsystem, memory, data storage, communication circuitry, and various peripheral devices, which are not illustrated in FIG. 1 for clarity of the present description. Further, although the illustrative system 100 of FIG. 1 includes three cloud customer computing devices 104, it should be understood that any number of cloud customer computing devices 104 may interact with the cloud monitoring server 102.

The cloud service providers 106 are configured to provide distributed data storage services, as discussed in more detail below. The cloud service providers 106 provide data storage and data access services to the entities controlling the cloud customer computing devices 104. The cloud service providers 106 also provide data storage location monitoring information to the cloud monitoring server 102 as discussed in more detail below. The cloud service providers 106 may be embodied as any type of data server (e.g., a web server) or similar computing device capable of performing the functions described herein. As such, the cloud service providers 106 may include components and features similar to the cloud monitoring server 102, such as a processor, I/O subsystem, memory, data storage, communication circuitry, and various peripheral devices, which are not illustrated in FIG. 1 for clarity of the present description. Further, although illustrated in FIG. 1 as a single server computing device, each cloud service provider 106 may be embodied as multiple devices cooperating together to facilitate the functionality described herein.

The cloud service providers 106 have access to distributed data 140, which may be accessible over a network. In some embodiments, the distributed data 140 may be stored in data storage of the respective cloud service provider 106. In other embodiments, the distributed data 140 may be distributed among one or more data servers, and may be geographically distributed among one or more regions or countries. For example, distributed data 140a may be located in the United States, distributed data 140b may be located in China, and distributed data 140c may be located in the European Union. Further, although the illustrative system 100 of FIG. 1 includes three cloud service providers 106 each with three instances of distributed data 140, it should be understood that any number of cloud service providers 106 may store and monitor the distributed data 140 in any number of locations.

Figure 2:
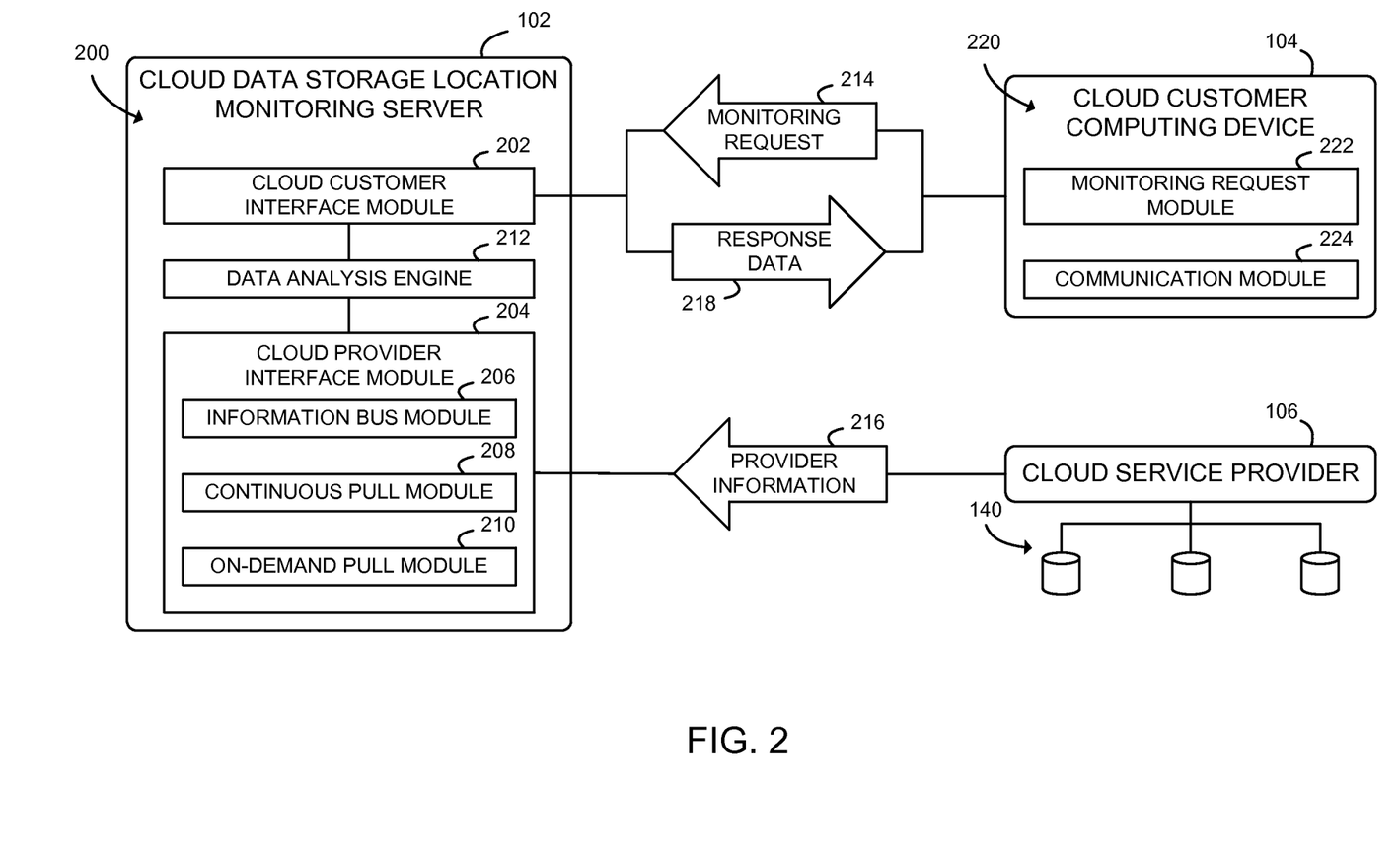
FIG. 2 is a simplified block diagram of at least one embodiment of an environment of a cloud data storage location monitoring server and an environment of a cloud customer computing device of the system of FIG. 1.

Referring now to FIG. 2, in one embodiment, the cloud monitoring server 102 establishes an environment 200 during operation. The illustrative environment 200 includes a cloud customer interface module 202, a cloud provider interface module 204, and a data analysis engine 212. The various modules of the environment 200 may be embodied as hardware, firmware, software, or a combination thereof.

The cloud customer interface module 202 is configured to receive monitoring requests 214 from the cloud customer computing devices 104. Each monitoring request 214 may be embodied as an on-demand request for storage location information or a continuous, policy-based request for storage location information. Each monitoring request 214 may request storage location information for one or more of the cloud service providers 106. Each monitoring request 214 may include one or more policies regarding data storage location. The cloud customer interface module 202 is further configured to send response data 218, produced by the data analysis engine 212, to the cloud customer computing devices 104.

The cloud provider interface module 204 is configured to retrieve provider information 216 from the cloud service providers 106. In some embodiments, the cloud provider interface module 204 may receive the provider information 216 published by the cloud service providers 106 on an information bus. The cloud provider interface module 204 may pull the provider information 216 directly from the cloud service providers 106, as demanded by cloud customer computing devices 104, or on a predefined schedule. In some embodiments, those functions may be performed by sub-modules, for example, by an information bus module 206, a continuous pull module 208, and/or an on-demand pull module 210.

The data analysis engine 212 is configured to transfer the monitoring request 214 between the cloud customer interface module 202 and the cloud provider interface module 204, and to prepare the response data 218 based on the provider information 216 and the monitoring request 214. The data analysis engine 212 may prepare additional analysis or recommendations for either the cloud customer computing devices 104 or the cloud service providers 106.

In one embodiment, each cloud customer computing device 104 establishes an environment 220 during operation. The illustrative environment 220 includes a monitoring request module 222 and a communication module 224. Similar to the modules of the environment 200 of the cloud monitoring servers 102, the various modules of the environment 220 of the cloud customer computing devices 104 may be embodied as hardware, firmware, software, or a combination thereof.

The monitoring request module 222 is configured to build monitoring requests 214, which, as discussed above, may be embodied as on-demand requests or continuous, policy-based requests. In some embodiments, the monitoring request module 222 may receive specified cloud service providers 106 to be monitored, specified cloud data to be monitored, or specified monitoring policies from a user of the cloud customer computing device 104.

The communication module 224 is configured to send the completed monitoring request 214 to the cloud monitoring server 102. The communication module 224 is also configured to receive response data 218 from the cloud monitoring server 102. Such response data 218 may be received immediately after sending the monitoring request 214, or may be received some time later, for example, when a condition of the monitoring policy has been satisfied.

Figure 3:
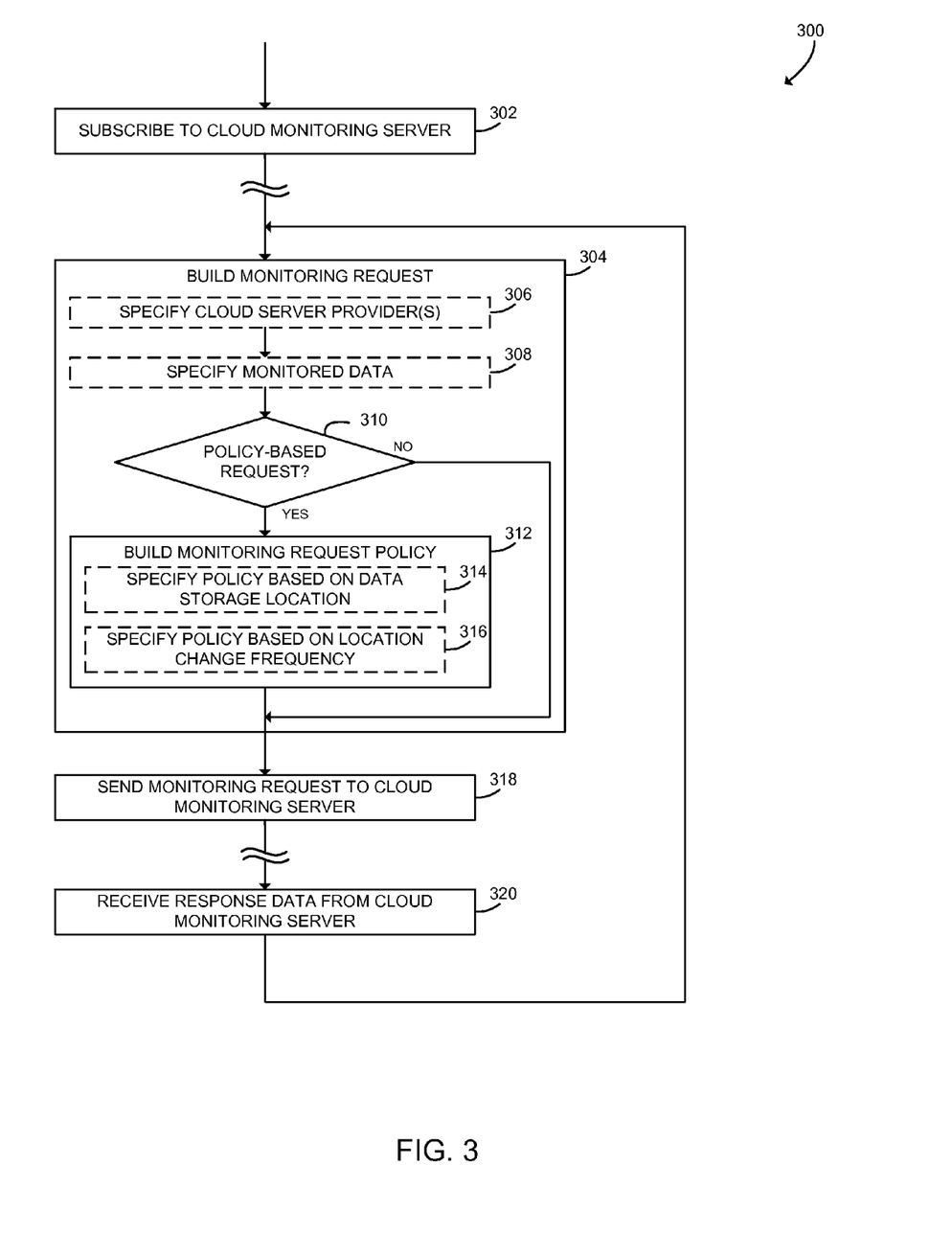
FIG. 3 is a simplified flow diagram of at least one embodiment of a method for monitoring cloud data storage location that may be executed by a cloud customer computing device of FIGS. 1 and 2.

Referring now to FIG. 3, in use, a cloud customer computing device 104 may execute a method 300 for monitoring cloud data storage location. The method 300 begins with block 302, wherein the cloud customer computing device 104 subscribes to the cloud monitoring service provided by the cloud monitoring server 102. As part of the subscription process, the cloud customer computing device 104 may establish authentication credentials with the cloud monitoring server 102. The cloud customer computing device 104 may also establish associations with one or more cloud service providers 106. The subscription process of block 302 may be performed some time before requesting storage location monitoring.

In block 304, the cloud customer computing device 104 builds a monitoring request 214. As discussed above, the cloud customer computing device 104 may build the monitoring request 214 for several purposes, including data storage location auditing, compliance monitoring, or control verification. As explained in more detail below, the cloud customer computing device 104 tailors the monitoring request 214 to support the use requested by the cloud customer.

In block 306, the cloud customer computing device 104 may specify one or more cloud service providers 106 in the monitoring request 214. The specified cloud service providers 106 may be determined based on user input at the cloud customer computing device 104, or may be determined according to the purpose of the monitoring request 214. Alternatively, the monitoring request 214 may rely on associations between the cloud customer computing device 104 and one or more cloud service providers 106 already established on the cloud monitoring server 102. In block 308, the cloud customer computing device 104 may specify particular data to be monitored in the monitoring request 214 (e.g., which data of the cloud customer is to be monitored). Again, the particular data to be monitored may be determined based on user input or on the monitoring needs of the cloud customer entity.

In block 310, the cloud customer computing device 104 determines whether the monitoring request 214 is policy-based. Such determination may be based on user input, or based on the monitoring needs of the cloud customer. If not policy-based, then the monitoring request 214 is determined to be on-demand, and the method 300 advances to block 318. Alternatively, if the monitoring request 214 is determined to be policy-based, the method 300 advances to block 312.

In block 312, the cloud customer computing device 104 builds a monitoring request policy for the monitoring request 214. Parameters of the monitoring policy may be set by user input, or according to needs of the cloud customer. In one illustrative embodiment shown in block 314, the cloud customer computing device 104 may specify a monitoring policy based on data storage location. For example, the monitoring policy may define particular countries or geographical locations where data storage is allowed (a so-called "whitelist"). In some embodiments, the monitoring policy may define particular countries where data storage is prohibited (a so-called "blacklist"). Such geographical locations (or "geo-locations") may include any geographical location including, but not limited to countries, particular states or regions within a country or countries, multiple countries, cities, and/or other geo-locations.

Additionally or alternatively, in some embodiments, the monitoring policy may define more complicated relationships (e.g., where the storage location changes from a first country or geographical location to a second country or geographical location). In such embodiments, the cloud customer computing device 104 may specify a monitoring policy based on location change frequency in block 316. For example, the cloud customer entity may request to be notified every time storage location changes, or only if storage location changes more frequently than a reference frequency (e.g., more than once per day, twice per month, ten times per month, etc.).

In block 318, the cloud customer computing device 104 sends the completed monitoring request 214 to the cloud monitoring server 102. The cloud customer computing device 104 may authenticate or otherwise validate the monitoring request 214 with the cloud monitoring server 102, for example using authentication credentials established in block 302. After sending the monitoring request 214, the cloud customer computing device 104 may immediately await a response to on-demand requests from the cloud monitoring server 102. For continuous, policy-based requests, the cloud customer computing device 104 may yield to other processes and restart the method 300 upon receiving a response.

In block 320, the cloud customer computing device 104 receives the response data 218 from the cloud monitoring server 102. In some embodiments, the response data 218 may include recommendations from the cloud monitoring server 102. Such recommendations may include recommended services available from the cloud service providers 106 related to the request, and in some embodiments may include additional or alternate recommended cloud service providers 106. The cloud customer computing device 104 may use the response data 218 according to the needs of the cloud customer. For example, the response data 218 may be presented in a user interface, or may be incorporated in an additional process, for example in an audit report (not pictured). After receiving the response data 218, the method 300 loops back to block 304 to build another monitoring request 214.

Figure 4:
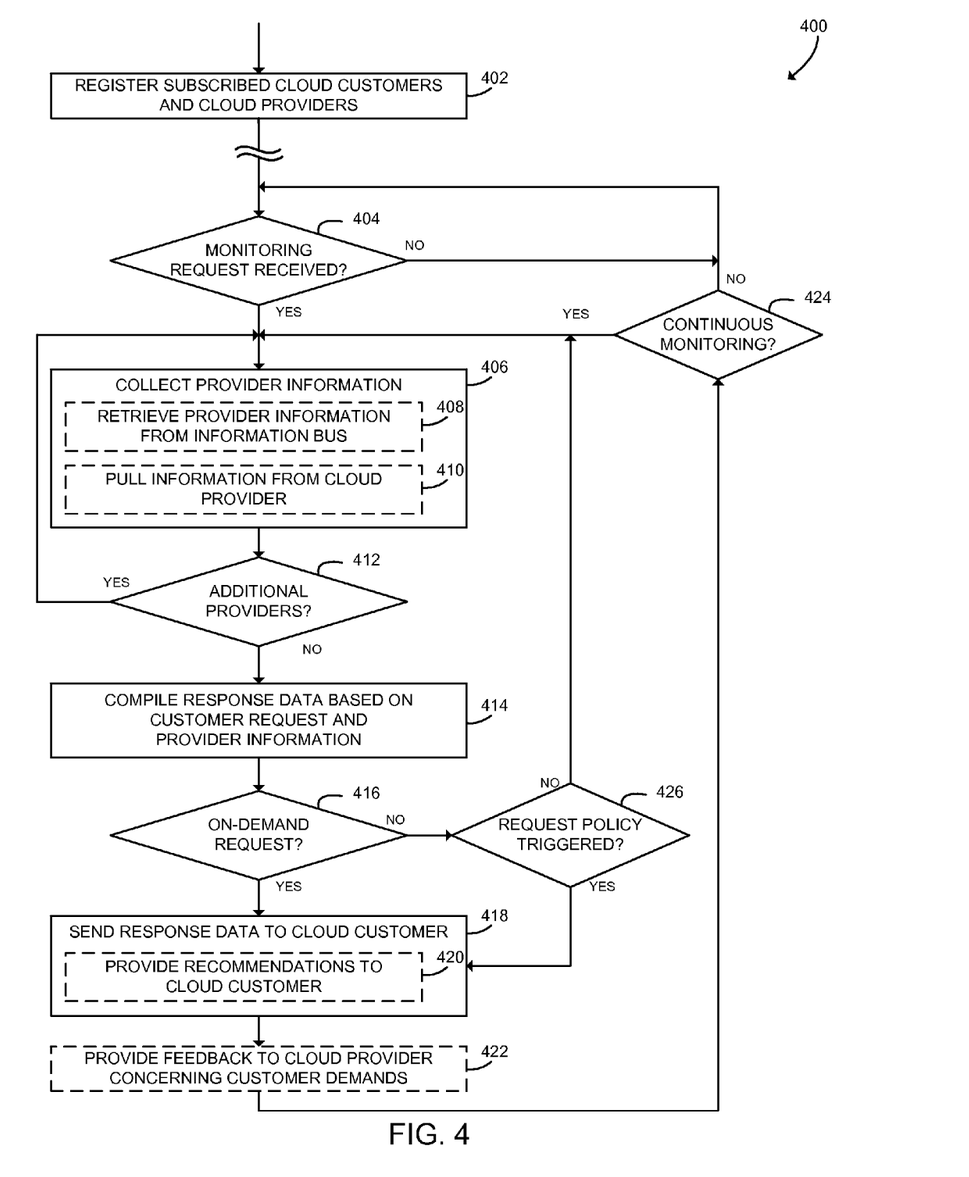
FIG. 4 is a simplified flow diagram of at least one embodiment of a method for monitoring cloud data storage location that may be executed by the cloud data storage location monitoring server of FIGS. 1 and 2.

Referring now to FIG. 4, in use, the cloud monitoring server 102 may execute a method 400 for monitoring cloud data storage location. The method 400 begins with block 402, wherein the cloud monitoring server 102 registers subscribing cloud customer computing devices 104 and cloud service providers 106. As part of the registration process, each cloud customer computing device 104 or cloud service provider 106 may establish authentication credentials with the cloud monitoring server 102. The cloud monitoring server 102 may perform additional tasks as part of registration, for example, associating each cloud customer computing device 104 with one or more cloud service providers 106, or verifying the cloud data relationships between each cloud customer computing device 104 and one or more cloud service providers 106. Registration may occur some time prior to cloud data storage location monitoring.

In block 404, the cloud monitoring server 102 determines whether a monitoring request 214 has been received from a cloud customer computing device 104. The cloud monitoring server 102 may authenticate or validate the monitoring request 214, for example, by authenticating credentials of the cloud customer computing device 104 previously established in block 402, or by verifying that the cloud customer computing device 104 has a cloud data storage relationship with one or more of the cloud service providers 106. If no monitoring request 214 has been received, the method 400 loops back to block 404 to continue waiting for a monitoring request 214. If a monitoring request 214 has been received, the method 400 advances to block 406.

In block 406, the cloud monitoring server 102 collects provider information 216 from a cloud service provider 106. The cloud service provider 106 may be specified in the monitoring request 214. If not specified in the monitoring request 214, the cloud monitoring server 102 may determine the cloud service provider 106 based on a previously established relationship between the cloud customer computing device 104 and the cloud service provider 106. In some embodiments, in block 408 the cloud monitoring server 102 retrieves provider information 216 from an information bus. An information bus is a communications facility allowing information to be exchanged between components and devices using a common protocol. In general, entities may publish information to the information bus, and a decoupled set of entities may subscribe to that information on the information bus. Such an information bus is often used for application integration in large enterprises. Thus, a cloud service provider 106 may publish data storage location information using a standard protocol to the information bus, and the cloud monitoring server 102 may subscribe to receive such data storage location information from that cloud service provider 106, based on the received monitoring request 214. The information bus may be implemented as a module or server process of the cloud monitoring server 102, or may be implemented as a standalone data server (not pictured).

In some embodiments, in block 410 the cloud monitoring server 102 may pull the provider information 216 directly from a cloud service provider 106. Pulling information directly from the cloud service provider 106 may allow for customized information retrieval. Such customized retrieval, however, may be less cost-effective than providing information according to a standard protocol. Although illustrated in method 400 as a synchronous process initiated upon receiving the monitoring request 214, in some embodiments, the cloud monitoring server 102 may repeatedly pull the provider information 216 from the cloud service provider 106 in the background, in another process, or otherwise concurrently with the method 400.

In block 412, the cloud monitoring server 102 determines whether provider information 216 should be collected from additional cloud service providers 106. The monitoring request 214 may specify any number of cloud service providers 106. Alternately, the cloud customer computing device 104 may be associated with more than one cloud service provider 106. If additional cloud service providers 106 remain, the method 400 loops back to block 406 to continue collecting provider information 216. If no additional cloud service providers 106 remain, the method 400 advances to block 414.

In block 414, the cloud monitoring server 102 compiles the response data 218 based on the monitoring request 214 and the provider information 216. The response data 218 includes data storage location information for the cloud service providers 106 specified by the monitoring request 214. The response data 218 may include data storage location information for particular cloud data specified to be monitored in the monitoring request 214. The cloud monitoring server 102 may compile the response data 218 by packaging, formatting, or converting the provider information 216 for transmission to the cloud customer computing device 104. The cloud monitoring server 102 may perform additional analysis on the provider information 216, to develop recommendations and feedback as discussed below.

In block 416, the cloud monitoring server 102 determines whether the monitoring request 214 is an on-demand request. As discussed above, the cloud customer computing device 104 may request data storage location information on-demand, that is, directly in response to a particular request. Alternatively, the cloud customer computing device 104 may request continuous, policy-based monitoring, that is, to be provided with data storage location information as conditions of the policy are satisfied. If the monitoring request 214 is not on-demand, the method 400 branches to block 426, discussed below. If the monitoring request 214 is on-demand, the method 400 advances to block 418.

In block 418, the cloud monitoring server 102 sends the response data 218 to the cloud customer computing device 104. In some embodiments, in block 420, the cloud monitoring server 102 may also provide recommendations to the cloud customer computing device 104 along with the response data 218. Such recommendations may be based on the provider information 216 or on aggregate provider information collected from other cloud service providers 106. Such recommendations may include recommended modifications to the cloud customer's service level agreement with the cloud service provider 106, recommendations for alternate services available from the cloud service provider 106, or recommendations for alternative cloud service providers 106. For example, the cloud monitoring server 102 may recommend an alternative service from the cloud service provider 106 that more closely matches the geographic areas specified in the monitoring request 214.

In some embodiments, in block 422, the cloud monitoring server 102 provides feedback to one or more of the cloud service providers 106 concerning customer demands. Such recommendations may be based on the particular monitoring request 214 and response data 218, or may be based on aggregate information collected for other cloud customer computing devices 104. The cloud service provider 106 may use such feedback, for example, to determine frequently requested data storage locations or data storage locations favorable for certain cloud customer entities. Following block 422, the method 400 advances to block 424.

In block 424, the cloud monitoring server 102 determines whether continuous monitoring has been requested. For example, for an on-demand monitoring request 214, no further monitoring is required after delivering the response data 218 to the cloud customer computing device 104. However, for a continuous, policy-based monitoring request 214, the cloud monitoring server 102 continues to monitor for changes in the data storage location information without requiring another monitoring request 214. If continuous monitoring is not requested, the method 400 loops back to block 404 to continue waiting for another monitoring request 214. If continuous monitoring has been requested, the method 400 loops back to block 406 to continue collecting provider information 216.

Returning now to block 416, as stated above, if the cloud monitoring server 102 determines that the monitoring request 214 is not an on-demand request, the method 400 branches to block 426. In block 426, the cloud monitoring server 102 determines whether a policy-based monitoring request 214 has been triggered. As discussed above, a policy-based monitoring request 214 may specify certain conditions relating to storage locations. The monitoring policy may be triggered when one or more of the conditions has been satisfied. For example, the monitoring policy may be triggered when the storage location of existing data is changed, when the data storage location changes to a particular, specified country, or when the data storage location changes from a first specified country to a second specified country. If the monitoring request policy has been triggered, the method 400 advances to block 418, to send response data to the cloud customer computing device 104 and continue monitoring the storage location information. If the monitoring request policy has not been triggered, the method 400 loops back to block 406, to continue collecting provider information 216.

EXAMPLES

Illustrative examples of the devices and methods disclosed herein are provided below. An embodiment of the devices and methods may include any one or more, and any combination of, the examples described below.

Example 1 includes a cloud monitoring server for monitoring customer data stored by one or more cloud services, the cloud monitoring server comprising a cloud customer interface module to receive a monitoring request from a cloud customer computing device; a cloud provider interface module to collect provider information from a cloud service provider in response to receiving the monitoring request, the provider information to include storage location information of customer data stored by the cloud service provider; and a data analysis engine to compile response data based on the monitoring request and the provider information; wherein the cloud customer interface module is to send the response data to the cloud customer computing device.

Example 2 includes the subject matter of Example 1, and wherein the cloud provider interface module comprises a cloud provider interface module to collect provider information from each cloud service provider of a plurality of cloud service providers, in response to receiving the monitoring request.

Example 3 includes the subject matter of any of Examples 1 and 2, and wherein the data analysis engine is further to (i) determine whether the monitoring request includes a monitoring policy and (ii) determine, in response to determining the monitoring request includes a monitoring policy, whether a condition of the monitoring policy has been satisfied; the cloud customer interface module is further to send the response data to the customer in response to determining the condition of the monitoring policy has been satisfied; and the cloud provider interface module is further to continue to collect provider information in response to determining the monitoring request includes a monitoring policy.

Example 4 includes the subject matter of any of Examples 1-3, and wherein the condition of the monitoring policy comprises whether the provider information has changed.

Example 5 includes the subject matter of any of Examples 1-4, and wherein the condition of the monitoring policy comprises whether the data storage location has changed from a first country to a second country.

Example 6 includes the subject matter of any of Examples 1-5, and wherein the cloud provider interface module further comprises an information bus module to retrieve the provider information from an information bus provided by the cloud monitoring server.

Example 7 includes the subject matter of any of Examples 1-6, and wherein the cloud provider interface module further comprises an on-demand pull module to (i) request the provider information from the cloud service provider in response to receiving the monitoring request; and (ii) receive the provider information from the cloud service provider.

Example 8 includes the subject matter of any of Examples 1-7, and wherein the cloud provider interface module further comprises a continuous pull module to (i) repeatedly request the provider information from the cloud service provider at a reference interval, in response to receiving the monitoring request; and (ii) receive the provider information from the cloud service provider in response to each request.

Example 9 includes the subject matter of any of Examples 1-8, and wherein the data analysis engine is further to recommend an action to the cloud customer computing device based on the provider information.

Example 10 includes the subject matter of any of Examples 1-9, and wherein the data analysis engine is to recommend an alternative cloud provider to the cloud customer computing device based on the provider information.

Example 11 includes the subject matter of any of Examples 1-10, and wherein the data analysis engine is further to provide feedback information to the cloud service provider based on the monitoring request and the response data.

Example 12 includes a cloud customer computing device to request monitoring information for customer data stored by one or more cloud services, the cloud customer computing device comprising a monitoring request module to construct a monitoring request for storage location information of customer data stored by one or more cloud service providers; and a communication module to (i) send the monitoring request to a cloud monitoring server and (ii) receive response data from the cloud monitoring server in response to the monitoring request.

Example 13 includes the subject matter of Example 12, and wherein the monitoring request module is further to receive from a user of the cloud customer computing device a selection of at least one of: the one or more cloud service providers to be monitored and the customer data to be monitored; and the response data is to be based on the selected one or more cloud service providers and the customer data to be monitored.

Example 14 includes the subject matter of any of Examples 12 and 13, and wherein the monitoring request module is further to (i) receive from a user of the cloud customer computing device a condition to be satisfied as a function of the storage location information and (ii) include a monitoring request policy in the monitoring request, the monitoring request policy to define the received condition to be satisfied; wherein the response data is to be based on whether the condition of the monitoring request policy has been satisfied.

Example 15 includes the subject matter of any of Examples 12-14, and wherein the condition of the monitoring policy is to be satisfied upon a change in data storage location.

Example 16 includes the subject matter of any of Examples 12-15, and wherein the condition of the monitoring policy is to be satisfied when a data storage location of the customer data changes from a first geo-location to a second geo-location.

Example 17 includes a method to monitor customer data stored by one or more cloud services, the method comprising receiving, by a cloud monitoring server, a monitoring request from a cloud customer computing device; collecting, on the cloud monitoring server, provider information from a cloud service provider in response to receiving the monitoring request, the provider information to include storage location information of customer data stored by the cloud service provider; compiling, on the cloud monitoring server, response data based on the monitoring request and the provider information; and sending the response data from the cloud monitoring server to the cloud customer computing device.

Example 18 includes the subject matter of Example 17, and wherein collecting provider information from the cloud service provider comprises collecting provider information from each cloud service provider of a plurality of cloud service providers, in response to receiving the monitoring request.

Example 19 includes the subject matter of Examples 17 and 18, and further including determining, on the cloud monitoring server, whether the monitoring request includes a monitoring policy; determining, on the cloud monitoring server, in response to determining the monitoring request includes a monitoring policy, whether a condition of the monitoring policy has been satisfied; sending the response data to the customer in response to determining the condition of the monitoring policy has been satisfied; and continuing to collect provider information in response to determining the monitoring request includes a monitoring policy.

Example 20 includes the subject matter of Examples 17-19, and wherein determining whether the condition of the monitoring policy has been satisfied comprises determining whether the provider information has changed.

Example 21 includes the subject matter of Examples 17-20, and wherein determining whether the condition of the monitoring policy has been satisfied comprises determining whether the data storage location has changed from a first geo-location to a second geo-location.

Example 22 includes the subject matter of Examples 17-21, and wherein collecting the provider information from the cloud service provider comprises retrieving the provider information from an information bus provided by the cloud monitoring server.

Example 23 includes the subject matter of Examples 17-22, and wherein collecting the provider information from the cloud service provider comprises requesting the provider information from the cloud service provider in response to receiving the monitoring request; and receiving the provider information from the cloud service provider.

Example 24 includes the subject matter of Examples 17-22, and wherein collecting the provider information from the cloud service provider comprises repeatedly requesting the provider information from the cloud service provider at a reference interval, in response to receiving the monitoring request; and receiving the provider information from the cloud service provider in response to each request.

Example 25 includes the subject matter of Examples 17-24, and wherein sending the response data to the cloud customer computing device comprises recommending an action to the cloud customer computing device based on the provider information.

Example 26 includes the subject matter of Examples 17-25, and wherein recommending an action comprises recommending an alternative cloud provider to the cloud customer computing device based on the provider information.

Example 27 includes the subject matter of Examples 17-26, and further comprising providing feedback information from the cloud monitoring server to the cloud service provider based on the monitoring request and the response data.

Example 28 includes a method for requesting monitoring information for customer data stored by one or more cloud services, the method comprising constructing, on a cloud customer computing device, a monitoring request for storage location information of customer data stored by one or more cloud service providers; sending the monitoring request from the cloud customer computing device to a cloud monitoring server; and receiving, on the cloud customer computing device, response data from the cloud monitoring server in response to the monitoring request.

Example 29 includes the subject matter of Example 28, and further including receiving, on the cloud customer computing device, from a user of the cloud customer computing device, a selection of at least one of: the one or more cloud service providers to be monitored and customer data to be monitored; wherein the response data is to be based on the selected one or more cloud service providers and customer data to be monitored.

Example 30 includes the subject matter of Examples 28 and 29, and further including receiving, on the cloud customer computing device, from a user of the cloud customer computing device a condition to be satisfied as a function of the storage location information; and including, on the cloud customer computing device, a monitoring request policy in the monitoring request, the monitoring request policy to define the condition to be satisfied; wherein the response data is to be based on whether the condition of the monitoring request policy has been satisfied.

Example 31 includes the subject matter of Examples 28-30, and wherein including the monitoring request policy comprises specifying a condition to be satisfied upon a change in data storage location.

Example 32 includes the subject matter of Examples 28-31, and wherein including the monitoring request policy comprises specifying a condition to be satisfied when a data storage location of the customer data changes from a first geo-location to a second geo-location.

Example 33 includes a mobile communication device comprising a processor; and a memory having stored therein a plurality of instructions that when executed by the processor cause the mobile digital information display device to perform the method of any of Examples 17-32.

Example 34 includes one or more machine readable storage media comprising a plurality of instructions stored thereon that in response to being executed result in a mobile communication device performing the method of any of Examples 17-32.

The invention claimed is:

1. A cloud monitoring server for monitoring customer data stored by one or more cloud services, the cloud monitoring server comprising:
   a cloud customer interface module to receive a monitoring request from a cloud customer computing device, wherein the monitoring request comprises a request for geographic storage location information associated with customer data stored by a cloud service provider and a monitoring policy;
   a cloud provider interface module to collect provider information from the cloud service provider in response to receipt of the monitoring request, the provider information to include geographic storage location information of the customer data stored by the cloud service provider; and
   a data analysis engine to (i) determine whether a condition of the monitoring policy has been satisfied, wherein the condition of the monitoring policy comprises whether the geographic storage location information associated with the customer data has changed and (ii) compile response data based on the monitoring request and the geographic storage location information of the provider information, wherein the response data is indicative of a geographic location of the customer data stored by the cloud service provider;
   wherein the cloud customer interface module is to send the response data to the cloud customer computing device in response to the determination that the condition of the monitoring policy has been satisfied.

2. The cloud monitoring server of claim 1, wherein to collect the provider information comprises to collect provider information from each cloud service provider of a plurality of cloud service providers, in response to the receipt of the monitoring request.

3. The cloud monitoring server of claim 1, wherein:
   the cloud provider interface module is further to continue to collect provider information in response to receipt of the monitoring request that includes the monitoring policy.

4. The cloud monitoring server of claim 1, wherein the condition of the monitoring policy further comprises whether the geographic storage location of the customer data has changed from a first country to a second country.

5. The cloud monitoring server of claim 1, wherein the cloud provider interface module further comprises:
   an information bus module to retrieve the provider information from an information bus provided by the cloud monitoring server.

6. The cloud monitoring server of claim 1, wherein the data analysis engine is further to recommend an action to the cloud customer computing device based on the provider information.

7. The cloud monitoring server of claim 1, wherein the data analysis engine is further to provide feedback information to the cloud service provider based on the monitoring request and the response data.

8. One or more non-transitory, machine readable media comprising a plurality of instructions that in response to being executed cause a cloud customer computing device to:
   construct a monitoring request for geographic storage location information of customer data stored by one or more cloud service providers, wherein the monitoring request includes a monitoring policy that defines a condition to be satisfied as a function of the storage location information, wherein the condition comprises whether the geographic storage location information associated with the customer data has changed;
   send the monitoring request to a cloud monitoring server; and
   receive response data from the cloud monitoring server in response to the monitoring request, wherein the response data is indicative of a geographic location of the customer data stored by the one or more cloud service providers.

9. The one or more non-transitory, machine readable media of claim 8, further comprising a plurality of instructions that in response to being executed cause the cloud customer computing device to:
   receive from a user of the cloud customer computing device a selection of at least one of: the one or more cloud service providers to be monitored and the customer data to be monitored; and
   wherein the response data is to be based on the selected one or more cloud service providers and the customer data to be monitored.

10. The one or more non-transitory, machine readable media of claim 8, further comprising a plurality of instructions that in response to being executed cause the cloud customer computing device to:
    receive from a user of the cloud customer computing device the condition to be satisfied as a function of the storage location information;
    wherein the response data is to be based on whether the condition of the monitoring request policy has been satisfied.

11. The one or more non-transitory, machine readable media of claim 10, wherein the condition of the monitoring policy is to be satisfied upon a change in data storage location.

12. The one or more non-transitory, machine readable media of claim 8, wherein the condition of the monitoring policy is to be satisfied when a data storage location of the customer data changes from a first geo-location to a second geo-location.

13. One or more non-transitory, machine readable media comprising a plurality of instructions that in response to being executed result in a cloud monitoring server:

receiving a monitoring request from a cloud customer computing device, wherein the monitoring request comprises a request for geographic storage location information associated with customer data stored by a cloud service provider and a monitoring policy;

collecting provider information from a cloud service provider in response to receiving the monitoring request, the provider information to include geographic storage location information of the customer data stored by the cloud service provider;

determining whether a condition of the monitoring policy has been satisfied, wherein the condition of the monitoring policy comprises whether the geographic storage location information associated with the customer data has changed;

compiling response data based on the monitoring request and the geographic storage location information of the provider information, wherein the response data is indicative of a geographic location of the customer data stored by the cloud service provider; and sending the response data from the cloud monitoring server to the cloud customer computing device in response to determining that the condition of the monitoring policy has been satisfied.

14. The machine readable media of claim 13, wherein collecting provider information from the cloud service provider comprises collecting provider information from each cloud service provider of a plurality of cloud service providers, in response to receiving the monitoring request.

15. The machine readable media of claim 13, further comprising a plurality of instructions that in response to being executed result in the cloud monitoring server:

continuing to collect provider information in response to receiving the monitoring request that includes the monitoring policy.

16. The machine readable media of claim 13, wherein determining whether the condition of the monitoring policy has been satisfied further comprises determining whether the geographic storage location of the customer data has changed from a first geo-location to a second geo-location.

17. The machine readable media of claim 13, wherein collecting the provider information from the cloud service provider comprises retrieving the provider information from an information bus provided by the cloud monitoring server.

18. The machine readable media of claim 13, wherein collecting the provider information from the cloud service provider comprises one of:
(i) requesting the provider information from the cloud service provider in response to receiving the monitoring request and receiving the provider information from the cloud service provider; and
(ii) repeatedly requesting the provider information from the cloud service provider at a reference interval, in response to receiving the monitoring request, and receiving the provider information from the cloud service provider in response to each request.

19. The machine readable media of claim 13, wherein sending the response data to the cloud customer computing device comprises recommending an action to the cloud customer computing device based on the provider information.

20. The machine readable media of claim 13, further comprising a plurality of instructions that in response to being executed result in the cloud monitoring server providing feedback information from the cloud monitoring server to the cloud service provider based on the monitoring request and the response data.

21. A method to monitor customer data stored by one or more cloud services, the method comprising:

receiving, by a cloud monitoring server, a monitoring request from a cloud customer computing device, wherein the monitoring request comprises a request for geographic storage location information associated with customer data stored by a cloud service provider and a monitoring policy;

collecting, on the cloud monitoring server, provider information from a cloud service provider in response to receiving the monitoring request, the provider information to include geographic storage location information of the customer data stored by the cloud service provider;

determining, on the cloud monitoring server, whether a condition of the monitoring policy has been satisfied, wherein the condition of the monitoring policy comprises whether the geographic storage location information associated with the customer data has changed;

compiling, on the cloud monitoring server, response data based on the monitoring request and the geographic storage location information of the provider information, wherein the response data is indicative of a geographic location of the customer data stored by the cloud service provider; and sending the response data from the cloud monitoring server to the cloud customer computing device in response to the determination that the condition of the monitoring policy has been satisfied.

22. The method of claim 21, wherein collecting provider information from the cloud service provider comprises collecting provider information from each cloud service provider of a plurality of cloud service providers, in response to receiving the monitoring request.

23. The method of claim 21, further comprising:
continuing to collect provider information in response to receiving the monitoring request that includes the monitoring policy.

24. The method of claim 21, wherein determining whether the condition of the monitoring policy has been satisfied further comprises determining whether the geographic storage location of the customer data has changed from a first geo-location to a second geo-location.

25. The method of claim 21, wherein collecting the provider information from the cloud service provider comprises:
retrieving the provider information from an information bus provided by the cloud monitoring server.

26. The method of claim 21, wherein sending the response data to the cloud customer computing device comprises recommending an action to the cloud customer computing device based on the provider information.

27. The method claim 21, further comprising providing feedback information from the cloud monitoring server to the cloud service provider based on the monitoring request and the response data.

* * * * *